Oct. 9, 1945.  E. S. GORTON  2,386,308
PACKING MEANS FOR HARVESTED VEGETABLES
Original Filed Sept. 29, 1942  3 Sheets-Sheet 1
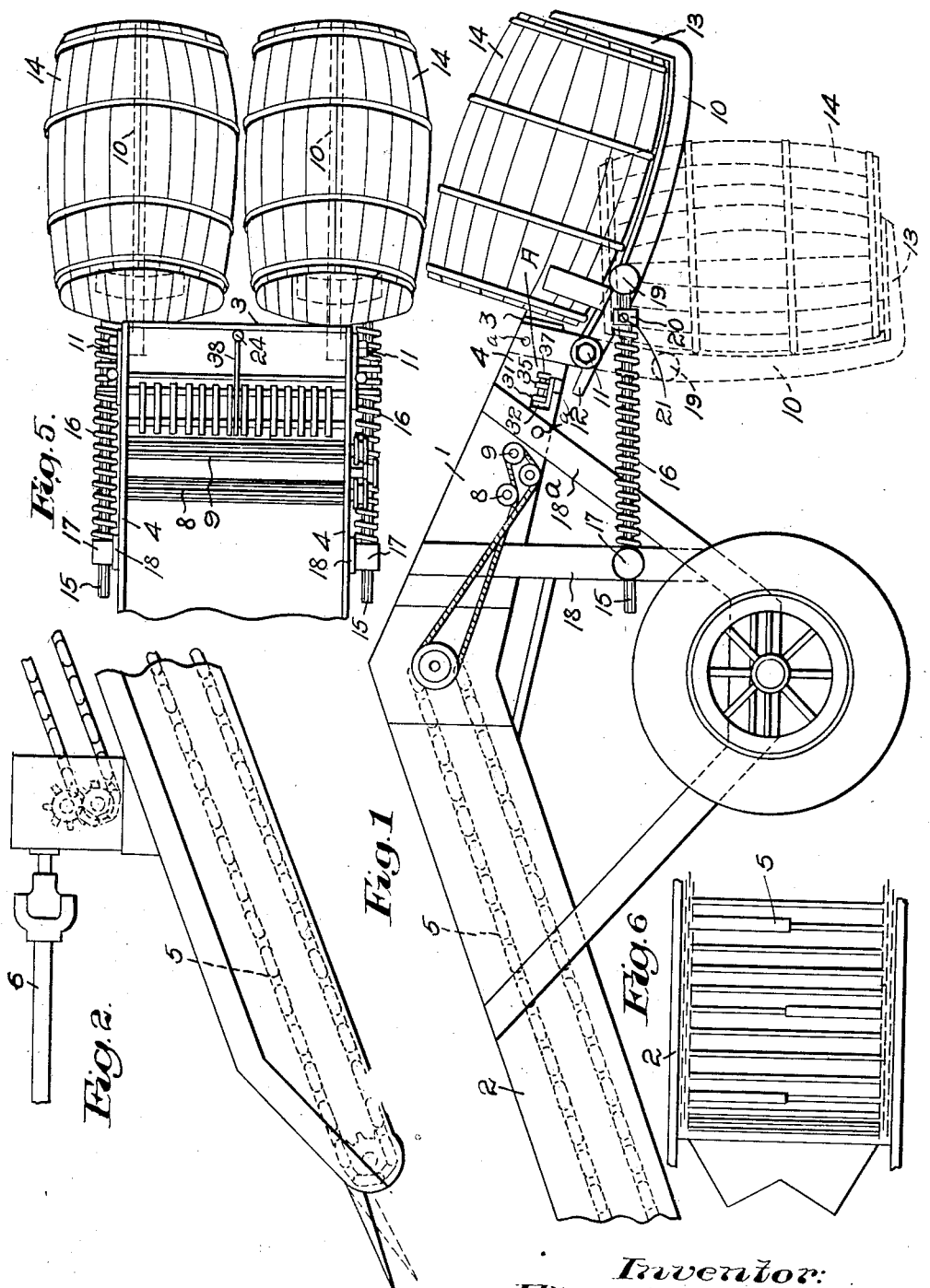
Inventor:
Edward S. Gorton, Oct. 9, 1945.  E. S. GORTON  2,386,308
PACKING MEANS FOR HARVESTED VEGETABLES
Original Filed Sept. 29, 1942  3 Sheets-Sheet 2
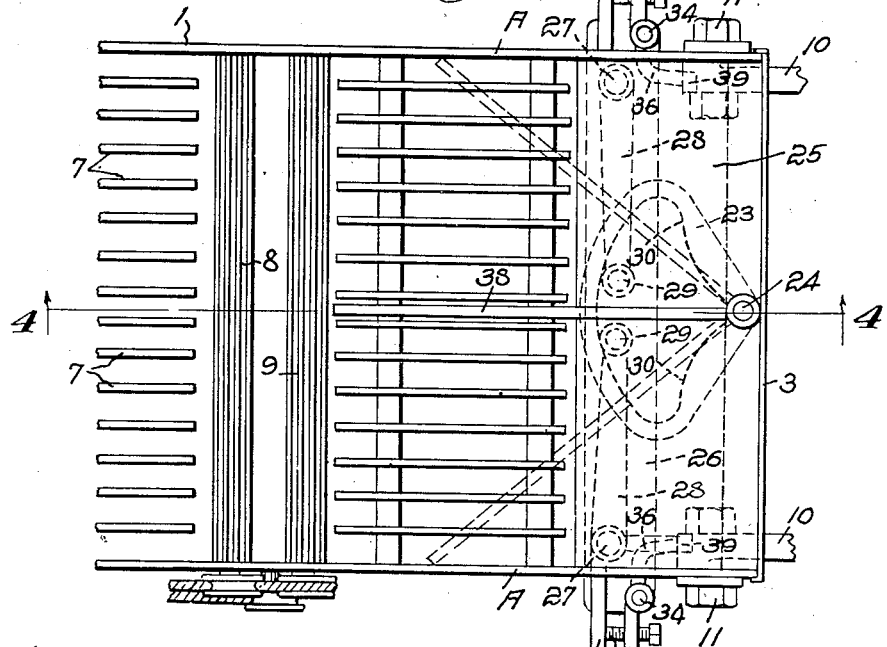
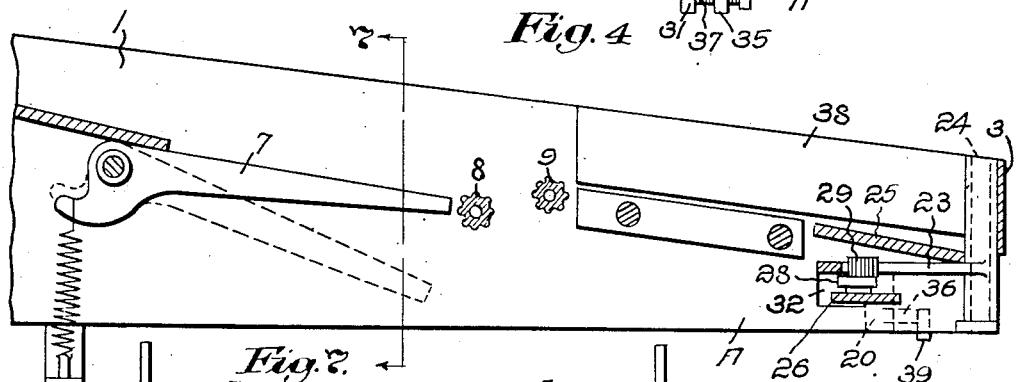
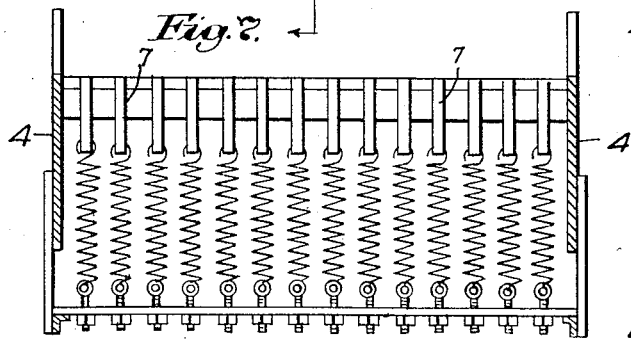
Inventor:
Edward S. Gorton Oct. 9, 1945.   E. S. GORTON   2,386,308
PACKING MEANS FOR HARVESTED VEGETABLES
Original Filed Sept. 29, 1942    3 Sheets-Sheet 3
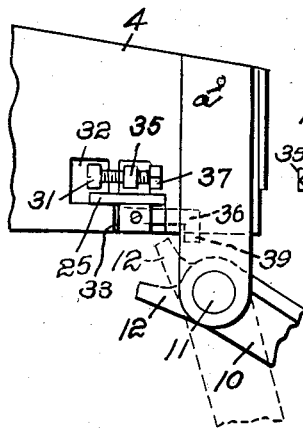
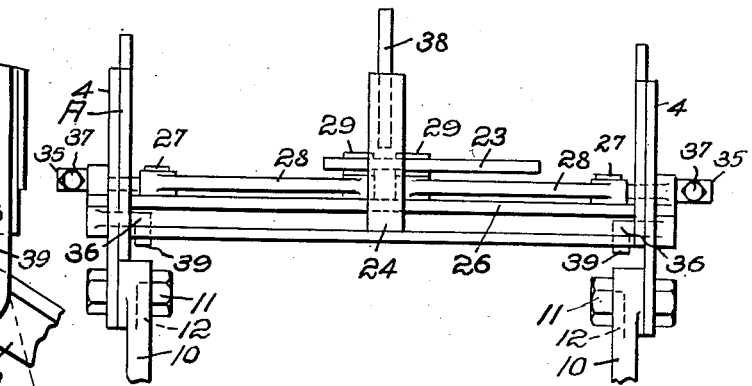
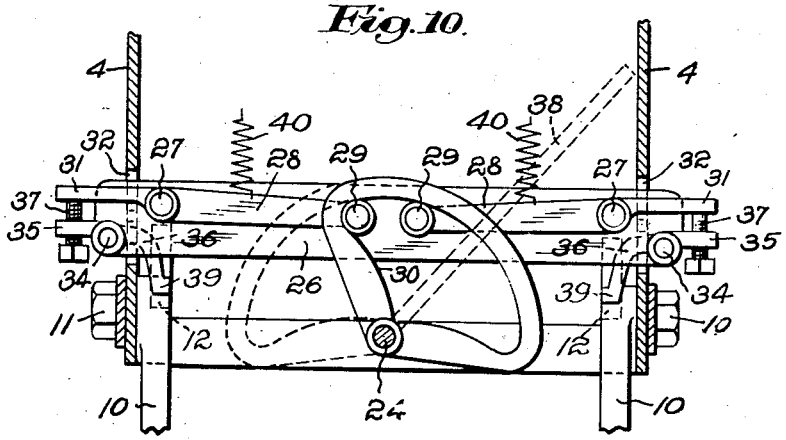
Inventor:
Edward S. Gorton, Patented Oct. 9, 1945

2,386,308

UNITED STATES PATENT OFFICE 2,386,308

PACKING MEANS FOR HARVESTED VEGETABLES

Edward S. Gorton, Mobile, Ala.

Original application September 29, 1942, Serial No. 460,104. Divided and this application October 16, 1943, Serial No. 506,527

6 Claims. (Cl. 226—61)

This application is a division of my prior application, Serial No. 460,104, filed September 29, 1942, for a Vegetable harvester, and the present application is for a novel packing means for harvested material as described and claimed therein. The packing means obviously may be used with harvesters of different types, preferably operated by power or other means, to feed the vegetables for treatment by the harvester, as disclosed in said application.

In the drawings:

Fig. 1 is a partial side elevation of a harvester equipped with my novel packing means;

Fig. 2, a similar view of the forward end of the harvester body;

Fig. 3, a plan of the rear end of the harvester body, on an enlarged scale, with the packing means thereon;

Fig. 4, a vertical, longitudinal, sectional view, on an enlarged scale, of the rear end of the harvester body, including part of the packing means, on the line 4—4, Fig. 3;

Fig. 5, a plan of the harvester rear body end and packing means with its containers;

Fig. 6, a partial plan of a vegetable conveyor and plough on the body, shown in Fig. 1;

Fig. 7, a rear view of the levers on the body, shown in Fig. 1, that may serve to separate the rocks and plants from the potatoes and leave them ready for packing;

Fig. 8, a rear view of some of the elements comprised in the packing means;

Fig. 9, a side elevation of the harvester body rear end, shown in Fig. 1, with some of the packing elements shown in Fig. 8; and Fig. 10, a plan of the packing means body rear end showing the elements that operate and control the direction of flow of the potato stream on its way to the containers of the packing means.

My novel packing means, Fig. 1, is adapted to be readily secured to the rear end of the most harvesters when constructed, or later, by any convenient means, as bolts $a$ or the like, and many operators feel that the harvesting of vegetables is not complete unless the vegetables are packed for shipment on the field.

At the discharging, Fig. 1, right-hand end 1 of the harvester body 2, shown in Figs. 1, 3, and which was the subject of the invention above already referred to, page 1, lines 1–5, the body rear end A is preferably provided with a vegetable brake or slow-down member, as a strip of heavy canvas 3 or the like, secured to the packing body sides 4, Fig. 3, to act as a brake to prevent the vegetables raised by the conveyor 5, Figs. 1, 2, operated as by a shaft 6, Fig. 2, from any suitable source of power, not shown, and separated from rocks by suitable means, as levers 7, spring controlled, Fig. 4, and potato forwarding roll 8, and stone dropping roll 9, Figs. 1, 4, from sliding out from the body too fast and becoming bruised when they hit the packing container, to be described.

At the body rear end A, Figs. 1, 3, 8, 9, 10, it is provided at each side with a rearwardly extended container-carrying arm 10 pivoted at 11 near its upper end to the packing means side body members 4, each arm 10 having, at its upper end, an upwardly extended short section 12 and at its lower end of the arm 10, Fig. 1, an upwardly extended arm-like seat member 13 to receive and support the container 14 which is shown, herein, as a barrel, two being provided in the present case.

Each arm 10, when the container is in use, is held normally in raised and rearwardly extended position, Fig. 1, by a rod 15 with a coiled spring 16 thereon, such rods at their forward ends being pivotally mounted upon posts 17 on the body supports 18, if convenient, or packing body supports as 18a, and posts 19 on the arms 10, the springs 16 being seated on the rods 15 between the posts 17 and collars 20 on the outer ends of the rods 15. The collars 20 are adjustable fastened on the rods as by set screws 21 to maintain the springs under proper and sufficient tension to hold each container in desired raised position, while it is being filled, without bruising the vegetables.

As the barrel or other container is filled, its weight gradually overcomes the resistance of the spring 16 and the container drops to an upright position, Fig. 1, dotted lines, on the member 13 from which it may be readily removed. Obviously either one or two barrels or other containers may be provided for and used, as desired. If two containers are provided, as herein, Figs. 1, 5, and for automatically shifting laterally the moving potato stream in the body from its position to flow to and fill one container, to the position to flow to and fill the other container, automatic means is provided to be operated by the filled container when it drops to upright position, to throw a second container into filling position, Fig. 1.

The potato stream shifting means comprises, in part, Figs. 3, 4, 8, 10, a cam race 23 carried near the lower end of the upright post 24 on the body, and beneath the body floor 25. On a cross support member 26 on the body A, Fig. 10, there are mounted, Fig. 10, as by studs 27, a plurality of movable horizontal arms 28, on the inner ends of which are rolls 29 designed to travel on the inside face 30 of the cam shaped race 23.

The outer ends 31 of the arms 28, Figs. 3, 9, extend outwardly through the slots 32, Figs. 1, 9, in the body sides 4. Vertically and pivotally mounted on each end of the support member 26, Figs. 8, 9, at the sides of the packing body 4 is a two-arm vertical shaft 34, Figs. 9, 10, the outer lateral arm 35 of which, Fig. 9, extends outwardly adjacent the arm end 31, while the other and inner arm 36 extends inwardly through the slot 33 and is curved rearwardly at 39 and overhangs the upwardly extended short section 12 of the arm 10, and by which the arms 28 and rolls 29, described, thereon are operated.

The outer ends of the arms 35 each carry a set screw 37 adjustable therein and operable against the outer ends 31 of the arm 28.

Normally the vegetable or potato stream shifter 38 on shaft 24 will be in central position, Figs. 3, 4, and one roll 29 will rest at each side of it, in the race 23, Figs. 3, 10, just below the body floor 25. When the vegetable stream shifter is used, the operator will first manually position the shifter to direct the vegetables, as they roll, not drop and perhaps bruise, from the harvester down a slight incline, to the container also on an incline to be filled first, as in Fig. 10, where the shifter is shown in dotted line position, to guide the stream of vegetables to the container at the left of Fig. 10, looking at the end of the harvester.

When the container is filled its weight overcomes the resistance of the spring 16 on the arm 10 and the container drops automatically to the perpendicular position, Fig. 1, dotted lines, the left-hand arm 10, Figs. 1, 5, swings on its pivot 11 and its upper end 12 moves rearward slightly, Fig. 9, and strikes the down-turned end 39 of the horizontal arm 36, Figs. 9, 10, on the shaft 34 on the member 26, throws the arm 35 on the shaft 34 with the screw 37 in the slot 33, causing the inner end of the screw 37 thereon to contact the outer end of the arm 31 to move it and the arm 28 with the roll 29 thereon on the face 30 of the race 23, and thus swing the shifter 38 to the left to cause the potato stream to flow to the right, Fig. 10, and fill the other barrel.

When this container is filled, in turn, a like movement of the other arm 10 on its side of the container support produces an opposite movement of the stream shifter.

Springs 40 on arms 28 and secured to the body floor 25, not shown, Fig. 10, return the cam rolls 29 in each case at once to normal position to hold the arms 28 with the rolls 29 in close central contact with the race 23.

My invention is not limited to the disclosure of the drawings and specification herein, as obviously many changes in the construction may be made, all within the scope of the specification and claims.

I claim:

1. Packing means for vegetables comprising a body with a floor and ends and supports therefor, and means for securing the body to a source of supply; means on the packing means body comprising a vegetable stream director including a post movable in the body floor, a wing on the post to guide the vegetable stream to a container; a cam-shaped roll race on the post lower end, laterally extended arms pivoted on the packing body with a roll on the inner arm ends and positioned to travel in said cam race; arms pivoted on the body to carry vegetable containers; a shaft carrying arms on the body, with an outer arm thereon swingable in the path of the inner end of the roll carrying arm on the body; an inner arm on the said shaft positioned to be moved and controlled by the inner end of the container carrying arm; the adjacent end of the said container carrying arm being swingable against an inner end of the shaft carrying arm to cause said roll to travel in said race and move the post with the vegetable directing wing thereon to direct the flow of vegetables to the container.

2. In a machine for packing vegetables into containers, the combination of two members each presenting a seat for the bottom of a container such as a barrel and an arm extending upwardly from said seat to engage the side of the container, each arm being pivoted near its upper end to swing the container from a sloping position toward a generally upright position in response to gravity as the container is loaded, and instrumentalities to cause vegetables to be delivered to one or the other of the containers, said instrumentalities including a stream shifter, and mechanism operated by tilting of each member to cause said stream shifter to shift the stream of vegetables to the container on the other member.

3. In a machine for packing vegetables into containers, the combination of two members each presenting a seat for the bottom of a container such as a barrel and an arm extending upwardly from said seat to engage the side of the container, each arm being pivoted near its upper end to swing the container from a sloping position toward a generally upright position in response to gravity as the container is loaded, and instrumentalities to cause vegetables to be delivered to one or the other of the containers, said instrumentalities including a stream shifter, and mechanism operated by tilting of each member to cause said stream shifter to shift the stream of vegetables to the container on the other member, said mechanism including a shifter operating cam having two faces presented toward each other, and two levers operated by said members, respectively, and acting on said faces, respectively, to move said cam and said shifter.

4. In a machine for packing vegetables into containers, the combination of two members each presenting a seat for the bottom of a container such as a barrel and an arm extending upwardly from said seat to engage the side of the container, each arm being pivoted near its upper end to swing the container from a sloping position toward a generally upright position in response to gravity as the container is loaded, and instrumentalities to cause vegetables to be delivered to one or the other of the containers, said instrumentalities including a stream shifter, and mechanism operated by tilting of each member to cause said stream shifter to shift the stream of vegetables to the container on the other member, said mechanism including a shifter operating cam having an opening in which there are two faces presented toward each other, and two cam followers in said opening and engageable with said faces, respectively, and operated thereby to move said cam and said shifter.

5. In a machine for packing vegetables into containers, the combination of two members each presenting a seat for the bottom of a container such as a barrel and an arm extending upwardly from said seat to engage the side of the container, each arm being pivoted near its upper end to swing the container from a sloping position toward a generally upright position in response to gravity as the container is loaded, and instrumentalities to cause vegetables to be delivered to one or the other of the containers, said instrumentalities including a stream shifter, and mechanism operated by tilting of each member to cause said stream shifter to shift the stream of vegetables to the container on the other member, said mechanism including a shifter operating cam having an opening in which there are two faces presented toward each other, two cam followers in said opening and engageable with said faces, respectively, and operated thereby to move said cam and said shifter, and springs which tend to restore said followers to normal position when said cam is restored to central position.

6. Vegetable packing apparatus for attachment to a source of supply, the same comprising a body having a floor to receive vegetables to be packed, a vegetable stream-director comprising a post with a vegetable guiding wing thereon above said floor and movably mounted in the vegetable stream on said floor, a stream-director operating cam on said post, cam actuators arranged to actuate said cam to cause said vegetable guiding wing to swing in opposite directions, respectively, vegetable container carrying arms pivoted on said body, each arm being arranged to swing downwardly when the container which it carries is filled, and connections between each arm and its associated cam actuator to utilize downward movement of such arm to raise the other arm and its empty container into vegetable receiving position and to swing said wing to direct vegetables to the empty container.

EDWARD S. GORTON.